(12) United States Patent
Smith et al.

(10) Patent No.: US 7,280,589 B2
(45) Date of Patent: Oct. 9, 2007

(54) SOURCE SYNCHRONOUS I/O BUS RETIMER

(75) Inventors: Brian L. Smith, Sunnyvale, CA (US); Jyh-Ming Jong, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 742 days.

(21) Appl. No.: 10/626,228

(22) Filed: Jul. 24, 2003

(65) Prior Publication Data

US 2005/0018760 A1 Jan. 27, 2005

(51) Int. Cl.
*H04L 25/60* (2006.01)
*H04L 7/00* (2006.01)

(52) U.S. Cl. .................. 375/215; 375/214; 375/376

(58) Field of Classification Search ............ 375/211, 375/214, 215, 326, 327, 371, 373, 376; 370/320, 370/324, 516, 517; 327/161
See application file for complete search history.

(56) References Cited

U.S. PATENT DOCUMENTS

| | | | |
|---|---|---|---|
| 4,665,518 A | 5/1987 | Champlin et al. | |
| 5,687,203 A * | 11/1997 | Baba | 375/376 |
| 6,178,206 B1 | 1/2001 | Kelly et al. | |
| 6,199,135 B1 | 3/2001 | Maahs et al. | |
| 6,336,159 B1 | 1/2002 | MacWilliams et al. | |
| 6,373,289 B1 | 4/2002 | Martin et al. | |
| 7,139,308 B2 * | 11/2006 | Doblar et al. | 375/215 |
| 2002/0075981 A1 * | 6/2002 | Tang et al. | 375/372 |

OTHER PUBLICATIONS

"XILINX: Using the Virtex Delay-Locked Loop"; XAPP132 Oct. 21, 1998 (Version 1.31); Advanced Application Note; pp. 1-14.
U.S. Appl. No. 10/117,427, filed Apr. 5, 2002.

* cited by examiner

*Primary Examiner*—Young T. Tse
(74) *Attorney, Agent, or Firm*—Meyertons Hood Kivlin Kowert & Goetzel, P.C.; Rory D. Rankin

(57) ABSTRACT

A device configured to recover and repeat source synchronous data. The device is configured to receive source synchronous data via a first interface and recover the received data utilizing a first clock signal which is generated to be approximately ninety degrees out of phase with the received clock signal. A second clock signal is generated to be in phase with the received source synchronous clock signal. The second clock signal is the utilized to select a newly generated clock signal and latched data for transmission in a source synchronous manner. The device is further configured to shift the phase of the generated first clock signal to be approximately ninety degrees out of phase with the received data signal.

21 Claims, 7 Drawing Sheets

SOURCE SYNCHRONOUS I/O BUS RETIMER

BACKGROUND OF THE INVENTION

1. Field of the Invention

This invention is related to the field of digital communications and, more particularly, to the transmission of digital signals.

2. Description of the Related Art

The design of advanced digital communication systems requires careful attention to the reliable transmission and receipt of signals in order to ensure proper functioning. One popular design methodology is that of synchronous design. Generally speaking, synchronous designs utilize a central clock which is distributed to various parts of the design. While utilizing a synchronous approach may simplify certain aspects of the design process, this approach is not without its problems. One such problem is that of clock skew. Because a central clock signal may be distributed to various parts of a system via board traces, backplanes, interconnects, and the like, clock skew may exceed that which can be tolerated by registers and other elements. Consequently, design techniques to minimize clock skew must be utilized to ensure proper system functioning. An additional consequence of using the synchronous design approach and distributing a clock signal throughout a system is the inherent phase delay that may accumulate. In a design where higher frequencies and performance are desired, these delays ultimately may cause the synchronous design approach to be untenable.

Source synchronous designs utilize a different approach than the synchronous design approach in order to obtain higher performance. Source synchronous designs transmit both a clock signal and data from a transmitter to receiver. The receiver then uses the received clock signal to recover the data. Because the clock signal and data are transmitted from the transmitter to receiver in parallel, some of the problems of a widely distributed clock signal are avoided. Consequently, higher frequencies may be more reliably maintained. Also, many source synchronous designs may utilize both edges of a transmitted clock signal for the transfer of data at a multiple of the transmitted clock rate. In this manner, even higher data throughputs may be achieved. Further, because both the clock signal and data are transmitted by a particular source, longer trace lengths may be supported.

While source synchronous designs may provide certain advantages over synchronous designs, they are not without their own problems. For example, the design must account for clock jitter due to noise. In addition, certain systems may require transmitting signals over relatively long distances. Even with the greater lengths which may be achieved using source synchronous designs, jitter and other signal degradation may limit the effective length of a transmission line. Further, signal degradation may also reduce the effective operating frequency which can be achieved.

What is desired is a method and mechanism for improving signal transmitting signals in source synchronous designs.

SUMMARY OF THE INVENTION

Other embodiments and details of embodiments will be described in the detailed description.

Generally speaking, a device is contemplated which is configured to repeat source synchronous data. In one embodiment, the device is configured to receive source synchronous data via a first interface, recover the received data and clock signal, and transmit source synchronous signals corresponding to the received signals with improved signal integrity.

In one embodiment, the repeater device is configured to receive source synchronous data via a first interface and recover the received data. The device includes circuitry which receives both a reference clock signal and the received clock signal and generates a first clock signal for latching the received data and a second clock signal. The first clock signal is generated to be approximately ninety degrees out of phase with the received data signal. The second clock signal is generated to be approximately ninety degrees out of phase with the received source synchronous clock signal. Additional circuitry is included which utilizes the reference clock signal and the second clock signal to generate a third clock signal which is in phase with the second clock signal. Subsequent to using the first clock signal to latch received data, the third clock signal is then utilized to select a clock signal and latched data corresponding to the received data and clock signals for transmission in a source synchronous manner.

BRIEF DESCRIPTION OF THE DRAWINGS

Other objects and advantages of the invention will become apparent upon reading the following detailed description and upon reference to the accompanying drawings in which.

Figure 1:
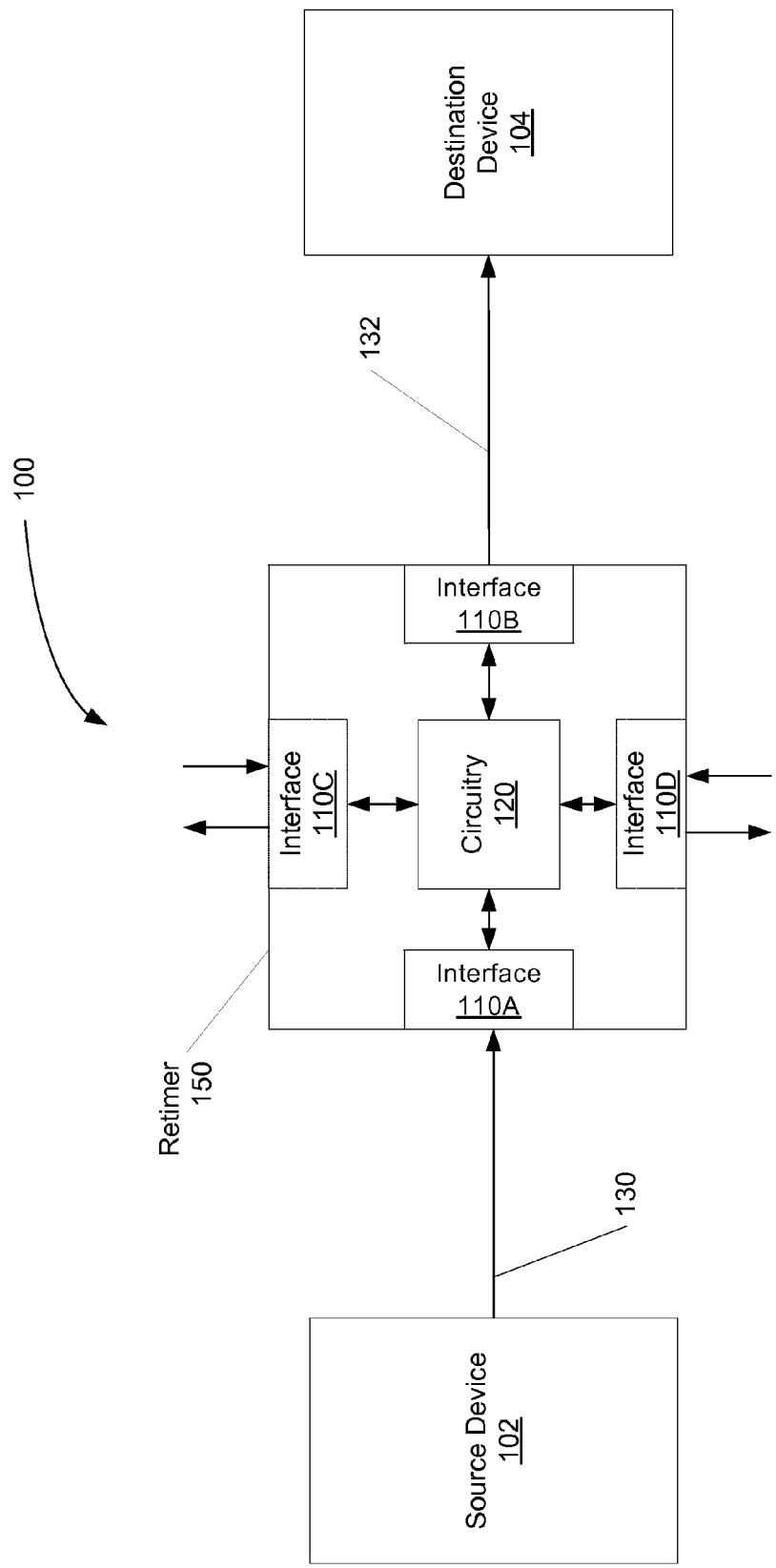
FIG. 1 illustrates one embodiment of a system employing a source synchronous repeater.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined be the appended claims.

DETAILED DESCRIPTION

FIG. 1 illustrates one embodiment of a source synchronous system 100 configured to transmit signals. In the example shown, a source device 102 is configured to convey signals to a destination device 104. Also shown in FIG. 1 is a retiming repeater chip 150 coupled between source device 102 and destination device 104. Retimer chip 150 includes input port 110A which is coupled to receive source synchronous signals from source device 102 via bus 130. Retimer chip 150 also includes output port 110B which is coupled to convey source synchronous signals to destination device 104 via bus 132. Also included in retimer chip 150 is circuitry 120, and optional additional ports 110C and 110D.

In one embodiment, source device 102 and destination device 104 may be physically separated by such a distance that signal degradation precludes efficient signal transmission directly from source device 102 to destination device 104. Therefore, rather than directly coupling source device 102 to destination device 104, retimer chip 150 is coupled between the source 102 and destination 104 in order to improve the quality of the signal received by destination device 104. By improving the quality of the signal, higher transmission speeds and/or greater transmission distances may be achieved by system 100. Generally speaking, circuitry 120 in retimer chip 150 is configured to remove jitter in received signals, and amplify signals prior to retransmitting them.

Figure 2:
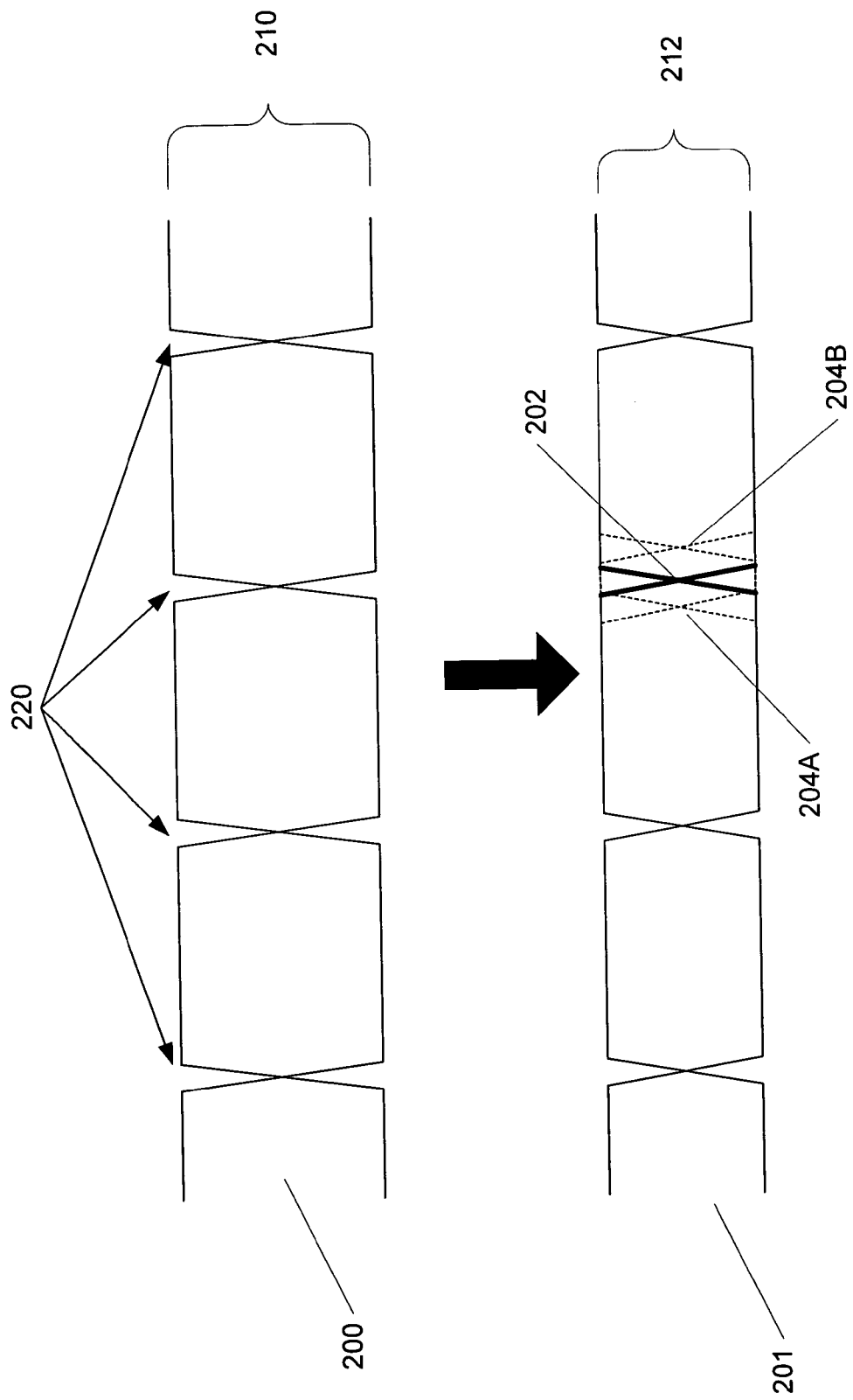
FIG. 2 shows an example of signal degradation.

FIG. 2 illustrates one example of signal degradation which may occur during transmission. Signal 200 illustrates an originally transmitted signal. Originally transmitted signal 200 is transmitted with a particular amplitude 210, and signal transitions occurring at particular times 220. Signal 201 illustrates one example of signal 200 after transmission and subsequent degradation. Due to noise, intersymbol interference, and/or impedance, signal 201 has a lower amplitude 212 than original signal 210. In addition, signal transitions 204A and 204B may not occur at times which correspond to the original signal 200. For example, transition 202 represents a transition which is timed according to the original signal 200. However, jitter may be present in the signal 201 which causes a transition to occur earlier 204A or later 204B than desired. Consequently, the overall integrity of signal 200 is degraded during transmission as illustrated by signal 201.

Figure 3:
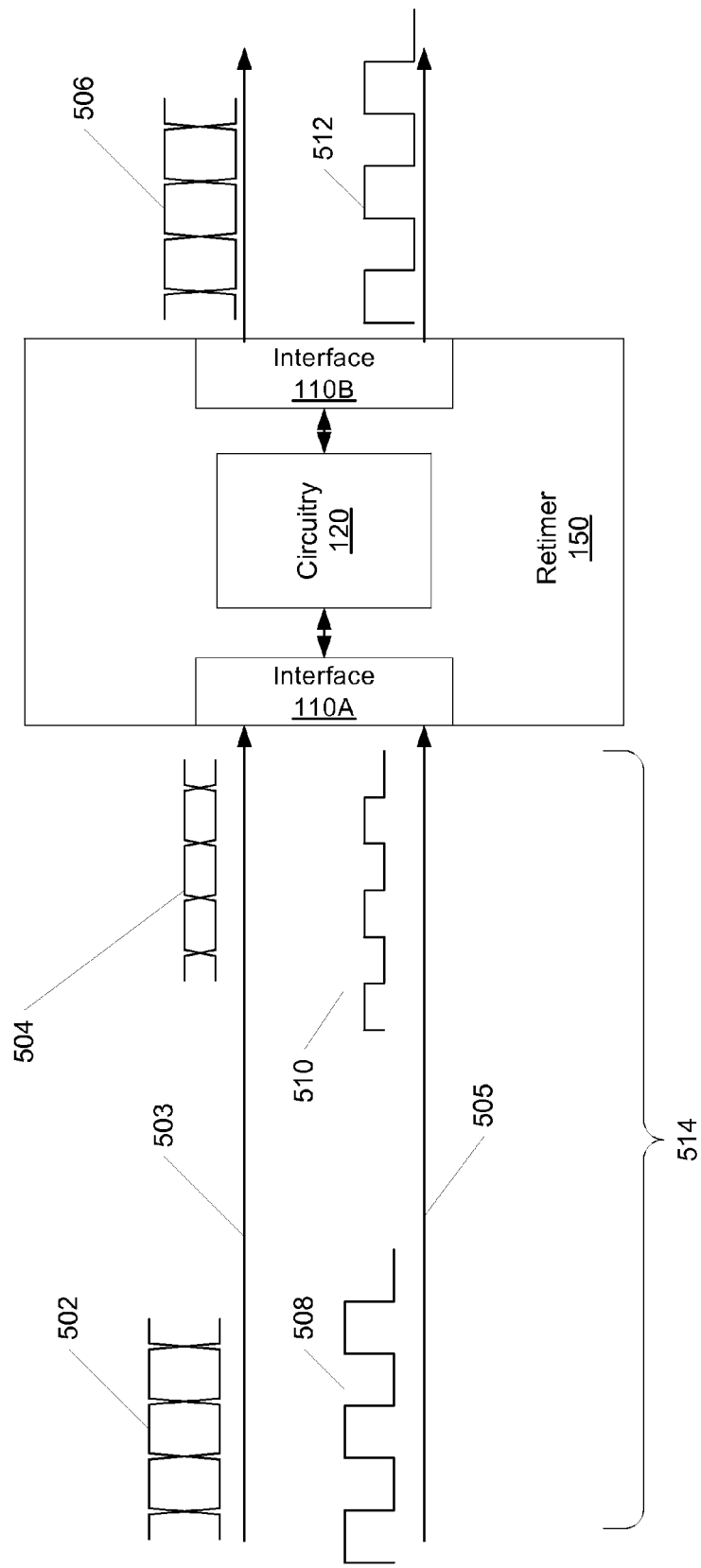
FIG. 3 illustrates one embodiment of repeater operation.

Turning now to FIG. 3, one embodiment of a retiming repeater 150 (alternately referred to as "retiming repeater", "retimer", or "repeater") and its function is illustrated. In the embodiment shown, repeater 150 is configured to receive a source synchronous signal via port 110A from device 507 and transmit a corresponding signal via port 110B. Circuit 120 is configured to control acquisition and transmission of the signals received and transmitted by repeater 150. Illustrated in FIG. 3 are a data line 503 and a clock line 505. A particular length 514 of each line 503 and 505 is indicated. Device 507 transmits signals 502 and 508 via lines 503 and 505 to repeater 150. Initially, signals 502 and 508 have a relatively good degree of integrity with respect to their original amplitude and timing. However, after traveling along the length of lines 503 and 505, signal 504 which corresponds to the original signal 502 has reduced amplitude (is attenuated) and may include jitter. Similarly, signal 510 which corresponds to original signal 508 has reduced amplitude and may include jitter. It is noted that the transmitted data signal 502 and clock signal 508 need not operate at the same frequency. Alternative embodiment may include source synchronous signals wherein the clock signal is either a higher or lower frequency than the corresponding data signal. For example, in one embodiment the transmitted clock signal 508 operates at a fraction of frequency of the data signal 502. In such an embodiment, the repeater 150 may be configured to multiply the received clock signal 508 in order to match the frequency of the received data signal 502. The multiplied clock signal may then be utilized to capture the received data. Those skilled in the art will appreciate that numerous such alternatives are possible.

Generally speaking, if signal integrity becomes sufficiently degraded through attenuation or jitter, the system may cease to function properly. FIG. 3 illustrates the function of repeater 150 whereby degraded source synchronous signals 504 and 510 are received, but corresponding source synchronous signals 506 and 512 are repeated (transmitted) with improved signal integrity. In one embodiment, repeater 150 may improve and/or restore signal integrity by eliminating certain jitter components in received data and retransmitting signals with increased amplitude. Consequently, because of the improved signal integrity introduced by repeater 150, greater transmission lengths and/or operating speeds may be achieved.

Repeating source synchronous signals may present especially difficult challenges given the nature of the timing requirements for signals in such systems. For example, because data and corresponding clock signals are conveyed concurrently, jitter which affects the data and clock signals to different degrees results in reduced ability to reliably latch the corresponding data. Consequently, merely repeating received signals in a somewhat blind fashion may only serve to increase jitter as the signal is transmitted. Still further, as attenuation of signals increases, the ability of receivers to reliably identify the data and/or clock signals being transferred is also compromised.

Figure 4:
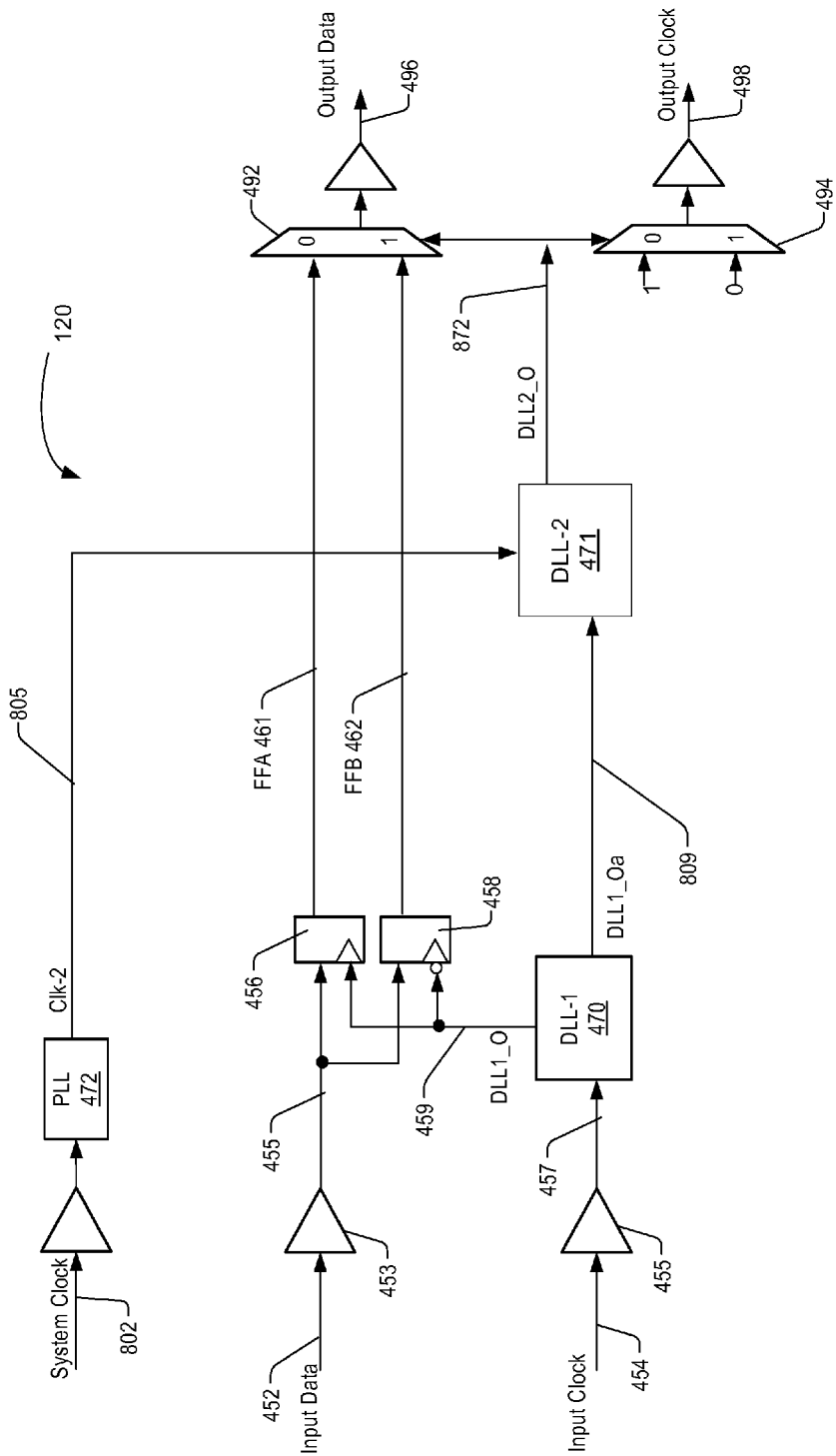
FIG. 4 illustrates one embodiment of a repeater.

FIG. 4 illustrates a portion of one embodiment of circuit 120. In the embodiment of FIG. 4, circuit 120 is configured to capture source synchronous signals and repeat them in a reliable manner. Generally speaking, circuit 120 is configured to receive source synchronous signals 452 and 454, and transmit corresponding source synchronous signals 496 and 498 with reduced jitter and attenuation. It is noted that signals 452 and 454 are illustrated as being received by receivers 453 and 455, respectively, and transmitted as corresponding signals 455 and 457. It is understood that delays may be introduced by receivers 453 and 455. However, for ease of discussion, the signals received by latches 456 and 458 may simply be referred to as input data 452. Also, the signals 454 and 457 may generally be referred to as the input clock signal.

As shown, circuit 120 includes latches 456 and 458 which are configured to receive input data 452. A first circuit 470, a delay locked loop (DLL-1) in the example shown, is coupled to receive input clock signal 454 and output clock signals 459 and 809. Also shown in the embodiment is a system clock signal 802. System clock signal 802, which may be generated locally or globally, is utilized by PLL 472 to generates a clock signal 805 which may generally serve as a reference clock signal. Clock signal 805 is coupled to DLL-2 471. Clock signal 459 is coupled to latches 456 and 458 and is utilized to latch data into latches 456 and 458. Clock signals 805 and 809 are coupled to DLL-2 471 which is further configured to convey clock signal 872 (DLL2_0). Latch outputs FFA 461 and FFB 462 are input to multiplexor 492. Another multiplexor 494 is configured to convey either a logic high or a logic low signal. Clock signal 872 is coupled as a select signal to both multiplexor 492 and 494. Finally, multiplexor 492 is configured to convey output data 496, and multiplexor 494 is configured to convey output clock 498.

In one embodiment, PLL 472 is configured to generate clock signal 805 with a frequency equal to that of the received clock signal 454. System clock signal 802 may be a clock signal operating with a frequency other than that of the received clock signal 454. In one embodiment, and for purposes of discussion, the clock signal 805 generated by PLL 472 is approximately twice the frequency of the system clock signal 802. As clock signal 805 is generated locally it may represent a relatively clean clock signal vis-à-vis the input clock signal 454 and may serve as the basis for the ultimately transmitted output clock signal 498. Similarly, the data signals 461 and 462 which correspond to output data 496 are also relatively clean (e.g., the data signals are restored to their pre-attenuated levels and jitter is removed) vis-à-vis the input data signal 452.

As an overview, DLL-1 470 receives input clock signal 457 and conveys corresponding clock signals 459 and clock signal 809. In one embodiment, DLL-1 470 is configured to generate clock signals 459 and 809 with a 90 degree phase shift, or delay, vis-à-vis the received clock signal 457. In this manner, the clock signal 459 which is used for latching the input data to latches 456 and 458 on alternate clock edges, may latch the data when the data is more stable and may result in improved data latching reliability. This latching of data will be discussed further below. In an alternative embodiment, clock signal 809 may be generated with a phase shift of other than 90 degrees vis-à-vis clock signal 457.

Multiplexor 492 is configured to receive signals FFA 461 and FFB 462 which are output from latches 456 and 458, respectively. DLL-2 471 is configured to receive clock signal 809 and generate a corresponding clock signal 872 which may be approximately in phase with clock signal 809. As already noted, in one embodiment, clock signal 809 may be generated with an approximately 90 degree phase shift versus clock signal 457. Consequently, clock signal 872 is derived from the "clean" clock signal 805 and may also be approximately in phase with the input clock signal 809. Clock signal 872 is then utilized to select data for output from multiplexor 492 and select a signal for output from multiplexor 494. Finally, data is transmitted from multiplexor 492 concurrently with a clock signal 498 via multiplexor 494. Accordingly, source synchronous data 452 and clock 454 may be retransmitted as source synchronous data 496 and clock 498 with jitter, noise, and other signal degradation reduced or removed.

In the above example it is noted that clock signal 459 is generated to be approximately 90 degrees out of phase with input data 455. As the received input clock signal 454 and input data 452 may have some phase shifting with respect to each other, a clock signal with a 90 degree phase shift versus the input data may be more or less that 90 degrees phase shifted from the input clock signal 454. In one embodiment, DLL-1 470 may be tuned during a power up test, or other procedure, to achieve a desired phase shift between the generated clock signal 459 and the input data 455. Consequently, the phase shift of clock signal 459 versus clock signal 457 may be more or less than 90 degrees. Those skilled in the art will understand and appreciate that such tuning procedures are possible. In addition, while it is possible to utilize phase shifts other than 90 degrees, a 90 degree phase shift is used for purposes of discussion herein. Still further, in an embodiment wherein additional phase shifting is not performed on signal 459 as compared to signal 809, DLL-1 470 maybe configured to generate only one signal which corresponds to signals 459 and 809.

Figure 5:
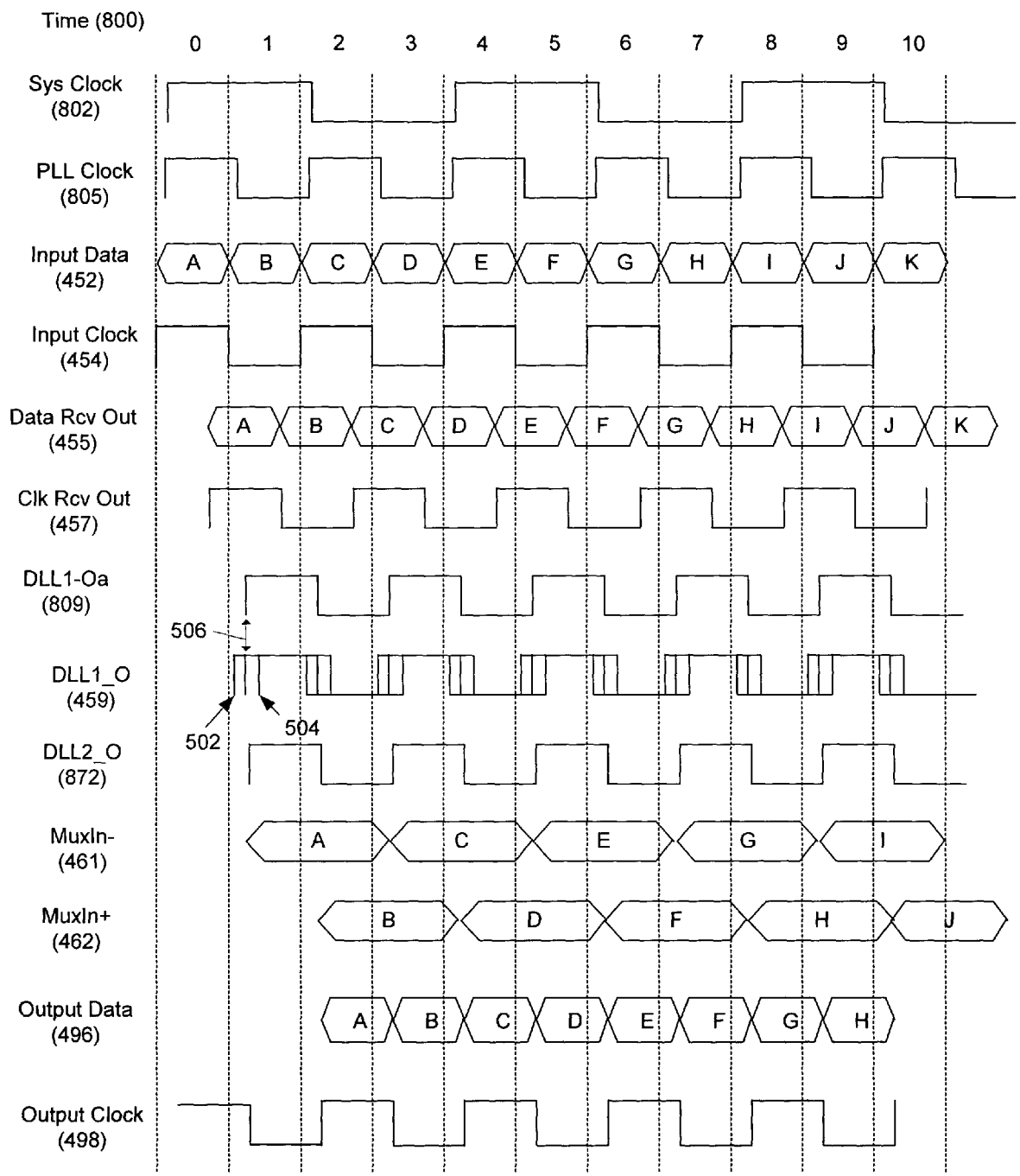
FIG. 5 illustrates one embodiment of the operation of the repeater of FIG. 4.

FIG. 5 illustrates one embodiment of a timing diagram corresponding to the operation of the circuit 120 shown in FIG. 4. The timing diagram is not intended to be precise, but rather is intended to be exemplary only. FIG. 5 shows a series of clock cycles during which source synchronous data is both received and transmitted by circuit 120. In the example shown, a timeline 800 is shown which illustrates eleven half clock cycles of the received input clock 454. FIG. 5 shows a system clock 802 and PLL clock 805 which is approximately twice the frequency of the system clock 802. Also illustrated in the diagram of FIG. 5 are input data 452 and input clock 454 as they are received at the input pads. Corresponding to the received data 452 and clock 454 are data rcv out 455 and clock rcv out 457. Data rcv out 455 and clock rcv out 457 represent the received data 452 and clock 454 taking into account delays which may be inherent in the receiving pads and buffers. In addition to the above, signals DLL1-0a 809 and DLL1_O 459 are shown, as well as signals 461 and 462 which are conveyed from latches 456 and 458, respectively. Signal DLL2_O 872 which is conveyed from DLL-2 471 is shown. Finally, output data 496 and output clock 498 are shown.

Figure 6:
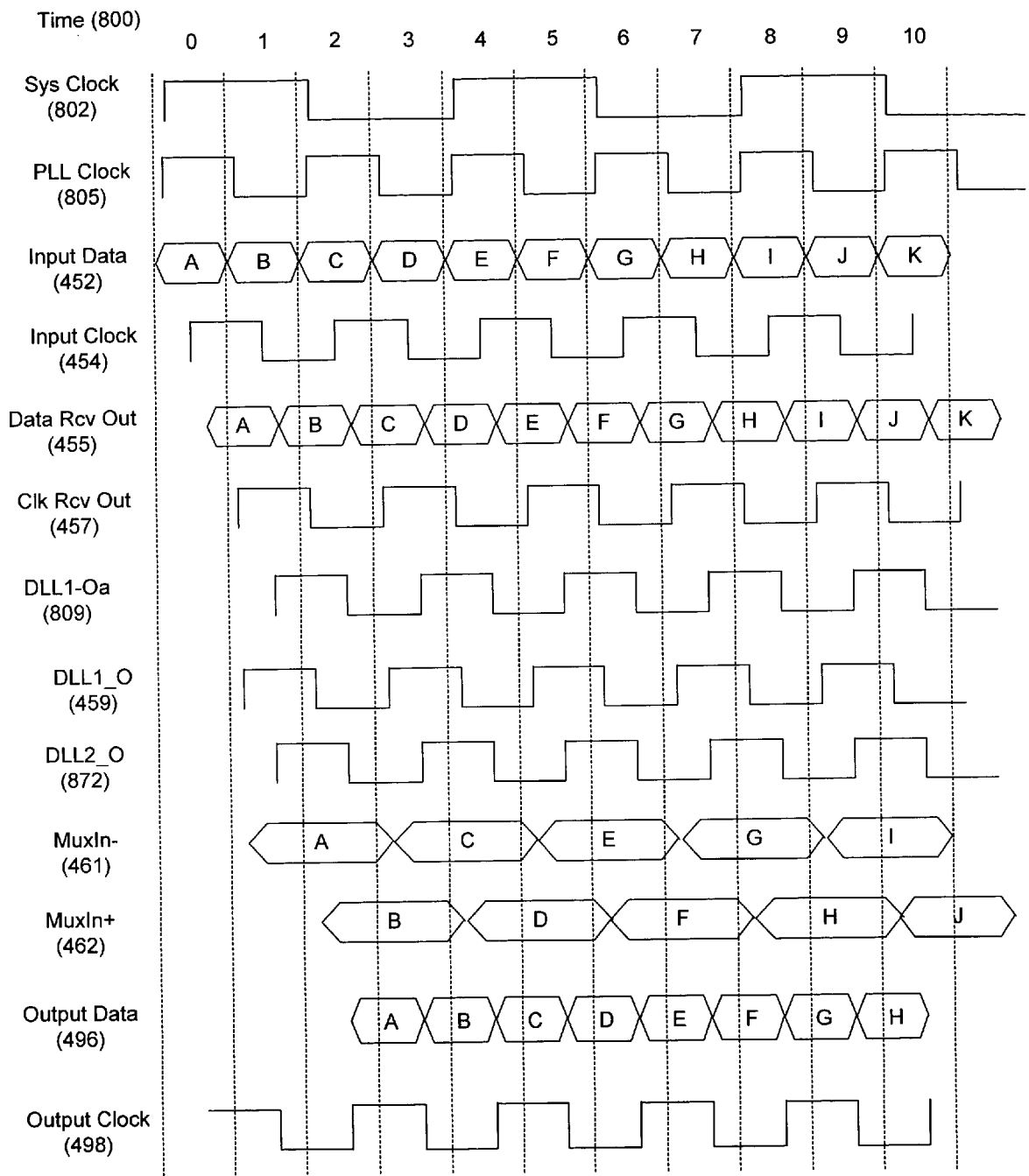
FIG. 6 illustrates one embodiment of the operation of the repeater of FIG. 4.

In the example shown in FIG. 5, at Time 0 input data 452 "A" is received with a rising edge and first phase of input clock 454. Data "A" and the received clock 454 are shown delayed, due to, for example, pad or buffer delays as mentioned above, as corresponding signals data 455 and clock 457. DLL-1 470 receives both the input clock signal 457 and the clock signal 805 generated by PLL 472. DLL-1 470 generates clock signals 459 and 809 to be approximately 90 degrees out of phase with input clock signal 457. Arrow 506 indicates where both signals 459 and 809 line up with respect to phase. Also indicated in signal 459, and as will be illustrated in FIG. 6, is the phase margining or shifting which may be performed on signal 459 to increase 504 or decrease 502 the phase shift in order to bring it into an approximate 90 degree phase shift with data signal 455. As already noted, this additional phase margining may be determined during boot or training sequence.

In the example shown, the received data 452 and clock 454 are in phase with one another. Consequently, the 90 degree shift performed by DLL-1 470 causes the rising and falling edges of clock signal 459 to occur approximately in the center of the data "eye" of the input data signal 455. In one embodiment, the input data 452 and/or input clock 454 signal may be transmitted via differential signaling. Other embodiments may utilize different signaling technologies. At Time 1, clock signal DLL1_O 459 latches data "A" 455 into latch 456. At Time 2, clock signal 459 latches data "B" 455 into latch 458. Latched values "A" 455 and "B" 455 are conveyed to multiplexor 492 as values 461 and 462, respectively. Signal DLL2_O 872 which is output from DLL-2 471 is conveyed to both multiplexor 492 and 494. At Time 2, signal 872 falls to logic value "0" which conveys signal 461 (data "A") from the multiplexor 492. In addition, at Time 2, signal 872 causes the logic value "1" to be conveyed from multiplexor 494. Accordingly, received data 452 and clock signal 454 may be re-conveyed as source synchronous data 496 and clock signal 498 with improved signal integrity as compared to the received signals which may be degraded. For simplicity of discussion in the illustration, delays which may be inherent in latches 456-458, multiplexors 492-494, and drivers 496-498 have been ignored.

FIG. 6 provides an illustration of the operation of the embodiment shown in FIG. 4 wherein the received data and clock signals are not precisely in phase with one another. In this example, input clock signal 454 is received approximately 90 degrees out of phase with respect to the corresponding data signal 452. DLL_1 470 generates clock signal 809 with a 90 degree offset versus clock signal 457. However, if DLL-1 470 were to merely generate latching clock signal 459 to that of clock signal 457, with a strictly 90 degree offset, the edges of clock signal 459 may not correspond to the center of the eye of corresponding data signal 455. Therefore, as discussed above, DLL-1 470 is configured to shift signal 459 forward or backward as necessary to better align with the data eye of signal 455. In this manner, not only is the data latched with a higher degree of reliability, but the jitter in the received signals may be reduced or removed in the corresponding output signals 96 and 498.

Figure 7:
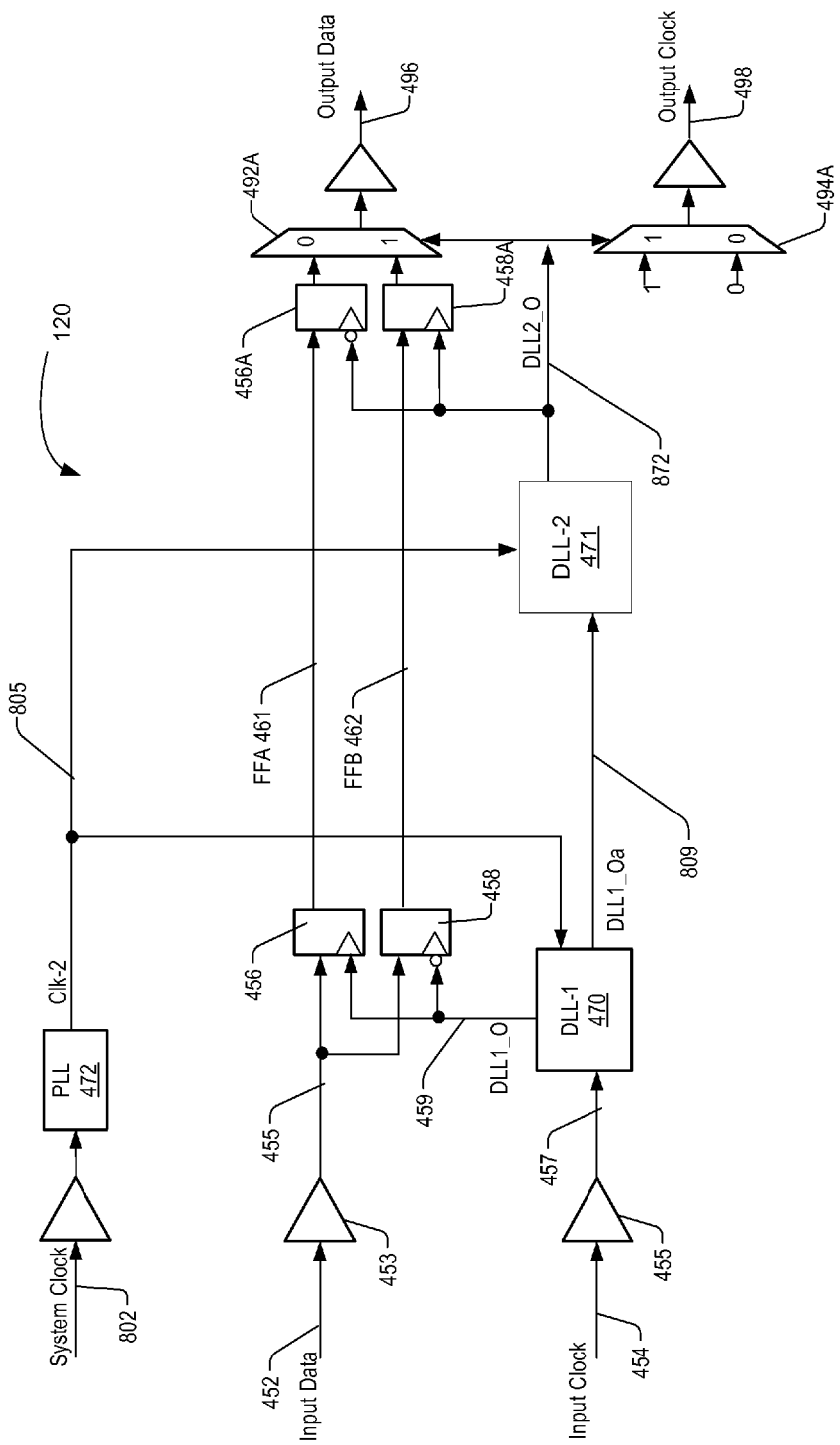
FIG. 7 illustrates one embodiment of a repeater.

FIG. 7 illustrates an alternative embodiment of circuit 120. In the embodiment illustrated in FIG. 7, each of the components and signals generally correspond to those discussed above and are numbered accordingly. However, in this embodiment, each of the latched data signals 461 and 462 are conveyed to further latches 456A and 458A, respectively. Use of latches such as 456A and 458A may be desired in some cases to account for any skew in signals 461 and 462 versus other signals in circuit 120. Utilizing additional latches as shown may result in an additional half cycle delay in the output signals 496 and 498. Also, in order to account for the additional latches, the signals conveyed from multiplexor 494A as the output clock signal 498 have been reversed. Numerous such alternative embodiments are possible and are contemplated.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A repeater device configured to repeat source synchronous data, said device comprising:
    a first interface configured to receive the source synchronous data comprising a first data signal and a first clock signal;
    a second interface configured to transmit source synchronous data; and
    circuitry coupled to said first interface, wherein said circuitry is configured to:
        utilize a reference clock signal and said first clock signal to generate a second clock signal;
        utilize said second clock signal to latch said first data signal;
        generate a third clock signal; and
        utilize said third clock signal to transmit in a source synchronous manner a data signal and a clock signal corresponding to said first data signal and the first clock signal via said second interface.

2. The device of claim 1, wherein said circuitry is configured to generate said third clock signal out of phase with said first clock signal.

3. The device of claim 2, wherein said circuitry comprises a first circuit configured to:
    receive said first clock signal;
    receive said reference clock signal; and
    generate said second clock signal to be approximately ninety degrees out of phase with said first clock signal.

4. The device of claim 3, wherein the first circuit is selected from the group consisting of: a delay locked loop, and a phase locked loop.

5. The device of claim 3, wherein said first circuit is further configured to:
    generate a fourth clock signal approximately ninety degrees out of phase with said first clock signal; and
    shift the phase of said generated second clock signal a first number of degrees to be approximately ninety degrees out of phase with said first data signal.

6. The device of claim 5, further comprising a second circuit configured to:
    receive said reference clock signal;
    receive said fourth clock signal; and
    generate said third clock signal to be approximately in phase with said fourth clock signal.

7. The device of claim 6, wherein said second circuit is selected from the group consisting of: a delay locked loop, and a phase locked loop.

8. The device of claim 5, wherein the first circuit is trainable to determine said first number of degrees.

9. A method for repeating source synchronous data, said method comprising:
    receiving said source synchronous data comprising a first data signal and a first clock signal;
    utilizing a reference clock signal and said first clock signal to generate a second clock signal;
    utilizing said second clock signal to latch said first data signal;
    generating a third clock signal; and
    utilizing said third clock signal to transmit in a source synchronous manner a data signal and a clock signal corresponding to said first data signal and the first clock signal.

10. The method of claim 9, wherein said third clock signal is generated out of phase with said first clock signal.

11. The method of claim 10, further comprising generating said second clock signal to be approximately ninety degrees out of phase with said first clock signal.

12. The method of claim 11, wherein said second clock signal is generated by a first circuit selected from the group consisting of: a delay locked loop, and a phase locked loop.

13. The method of claim 11, further comprising:
    generating a fourth clock signal approximately ninety degrees out of phase with said first clock signal; and
    shifting the phase of said generated second clock signal a first number of degrees to be approximately ninety degrees out of phase with said first data signal.

14. The method of claim 13, further comprising:
    receiving said reference clock signal in a second circuit;
    receiving said fourth clock signal in the second circuit; and
    generating said third clock signal to be approximately in phase with said fourth clock signal.

15. The method of claim 14, wherein said second circuit is selected from the group consisting of: a delay locked loop, and a phase locked loop.

16. The method of claim 13, further comprising training a first circuit which generates said second clock signal to determine said first number of degrees.

17. A source synchronous system comprising:
    a source device configured to convey source synchronous data comprising a first data signal and a first clock signal;
    a repeater device coupled to said source device, wherein said repeater device comprises:
        a first interface configured to receive said source synchronous data;
        a second interface configured to transmit source synchronous data; and
        circuitry coupled to said first interface, wherein said circuitry is configured to:
            utilize a reference clock signal and said first clock signal to generate a second clock signal;
            utilize said second clock signal to latch said first data signal;
            generate a third clock signal; and
            utilize said third clock signal to transmit in a source synchronous manner a data signal and a clock signal corresponding to said first data signal and the first clock signal via said second interface; and
        a destination device coupled to said repeater device, wherein said destination device is configured to receive said transmitted source synchronous data from said repeater device.

18. The system of claim 17, wherein said circuitry is configured to generate said third clock signal out of phase with said first clock signal.

19. The system of claim 18, wherein said circuitry comprises a first circuit configured to:
    receive said first clock signal;
    receive said reference clock signal; and generate said second clock signal to be approximately ninety degrees out of phase with said first clock signal.

20. The system of claim 19, wherein said first circuit is further configured to:
   generate a fourth clock signal approximately ninety degrees out of phase with said first clock signal; and
   shift the phase of said generated second clock signal a first number of degrees to be approximately ninety degrees out of phase with said first data signal.

21. The system of claim 20, wherein said circuitry further comprising a second circuit configured to:
   receive said reference clock signal;
   receive said fourth clock signal; and
   generate said third clock signal to be approximately in phase with said fourth clock signal; and
wherein said circuitry is configured to utilize said third clock signal to select for transmission in a source synchronous manner a data signal and a clock signal corresponding to said first data signal and the first clock signal.

* * * * *